(12) United States Patent
Cronin

(10) Patent No.: US 9,288,207 B2
(45) Date of Patent: *Mar. 15, 2016

(54) SECURE COMMUNICATIONS SMARTPHONE SYSTEM

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,437

(22) Filed: Sep. 4, 2014

(65) Prior Publication Data

US 2015/0319169 A1    Nov. 5, 2015

Related U.S. Application Data

(63) Continuation of application No. 14/266,816, filed on Apr. 30, 2014, now Pat. No. 8,838,071.

(51) Int. Cl.
*H04L 29/06* (2006.01)
*G06F 3/0481* (2013.01)
*G06F 3/0482* (2013.01)

(52) U.S. Cl.
CPC .......... *H04L 63/0861* (2013.01); *G06F 3/0482* (2013.01); *G06F 3/04817* (2013.01)

(58) Field of Classification Search
CPC .............. H04L 63/0861; G06F 3/0482; G06F 3/04817
See application file for complete search history.

(56) References Cited

U.S. PATENT DOCUMENTS

| 6,104,922 | A | 8/2000 | Baumann |
| 6,697,947 | B1 | 2/2004 | Matyas, Jr. et al. |
| 6,928,546 | B1 | 8/2005 | Nanavati et al. |
| 7,433,685 | B2 * | 10/2008 | Ritter ........................ 705/26.41 |
| 8,464,320 | B2 | 6/2013 | Archer et al. |
| 8,467,770 | B1 | 6/2013 | Ben Ayed |
| 8,589,667 | B2 | 11/2013 | Mujtaba et al. |

(Continued)

FOREIGN PATENT DOCUMENTS

| WO | WO 2015/168703 | 11/2015 |
| WO | WO 2015/187452 | 12/2015 |

(Continued)

OTHER PUBLICATIONS

Busch, Christop; "Biometric Transaction Authentication Protocol (BTAP)" Fraunhofer IGD, Gjovik University College, Aug. 26, 2011.

(Continued)

*Primary Examiner* — Brandon Miller
(74) *Attorney, Agent, or Firm* — Polsinelli LLP

(57) ABSTRACT

Methods, systems, and non-transitory data storage media are provided for secured communications where biometrics are used to secure communications sent over a data communication path. A sender of a secured communication may identify one or more biometrics required from a recipient before the recipient is allowed to interpret, read, view, or listen to the communication. Communications secured by the present invention may include email, text messages, iMessages, files, links, Universal Resource Locators (URLs), videos, photos, attachments, or other forms of electronic data or media communications.

20 Claims, 8 Drawing Sheets

(56) References Cited

U.S. PATENT DOCUMENTS

| | | | |
|---|---|---|---|
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,646,060 B1 | 2/2014 | Ben Ayed | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,838,071 B1 * | 9/2014 | Cronin | 455/411 |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 8,973,110 B2 | 3/2015 | Mizoguchi et al. | |
| 2002/0138767 A1 | 9/2002 | Hamid et al. | |
| 2003/0074317 A1 | 4/2003 | Hofi | |
| 2003/0135740 A1 | 7/2003 | Talmor et al. | |
| 2004/0049675 A1 | 3/2004 | Micali et al. | |
| 2004/0148526 A1 | 7/2004 | Sands et al. | |
| 2005/0195076 A1 | 9/2005 | McCulloch et al. | |
| 2005/0268107 A1 | 12/2005 | Harris et al. | |
| 2005/0273444 A1 | 12/2005 | Delgrosso et al. | |
| 2007/0192137 A1 | 8/2007 | Ombrellaro | |
| 2007/0273471 A1 | 11/2007 | Shilling et al. | |
| 2008/0086767 A1 | 4/2008 | Kulkarni et al. | |
| 2008/0102790 A1 | 5/2008 | Schultz | |
| 2008/0189776 A1 | 8/2008 | Constable | |
| 2008/0211627 A1 | 9/2008 | Shinzaki | |
| 2008/0261560 A1 | 10/2008 | Rukart | |
| 2009/0126013 A1 | 5/2009 | Atwood et al. | |
| 2009/0190802 A1 | 7/2009 | Adams et al. | |
| 2009/0265544 A1 | 10/2009 | Moona et al. | |
| 2010/0005293 A1 | 1/2010 | Errico | |
| 2010/0240415 A1 | 9/2010 | Kim et al. | |
| 2010/0253470 A1 | 10/2010 | Burke | |
| 2011/0107427 A1 | 5/2011 | Cohen et al. | |
| 2011/0215597 A1 | 9/2011 | Weum | |
| 2011/0239270 A1 | 9/2011 | Sovio et al. | |
| 2012/0072996 A1 | 3/2012 | Svendsen et al. | |
| 2012/0121140 A1 | 5/2012 | Gerken | |
| 2012/0144464 A1 | 6/2012 | Fakhrai | |
| 2012/0268241 A1 | 10/2012 | Hanna et al. | |
| 2012/0297464 A1 | 11/2012 | Busch et al. | |
| 2013/0103951 A1 | 4/2013 | Klevan et al. | |
| 2013/0117833 A1 | 5/2013 | Ochi | |
| 2013/0247156 A1 | 9/2013 | Savo | |
| 2013/0269013 A1 | 10/2013 | Parry et al. | |
| 2013/0303192 A1 | 11/2013 | Louboutin | |
| 2013/0317835 A1 | 11/2013 | Mathew | |
| 2013/0318580 A1 | 11/2013 | Gudlavenkatasiva et al. | |
| 2013/0328917 A1 | 12/2013 | Zhou | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2014/0002388 A1 | 1/2014 | Han et al. | |
| 2014/0003683 A1 | 1/2014 | Vieta et al. | |
| 2014/0004828 A1 | 1/2014 | Han et al. | |
| 2014/0006795 A1 | 1/2014 | Han et al. | |
| 2014/0007185 A1 | 1/2014 | Han et al. | |
| 2014/0007223 A1 | 1/2014 | Han et al. | |
| 2014/0007225 A1 | 1/2014 | Gay et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0106711 A1 * | 4/2014 | Seo et al. | 455/411 |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0270415 A1 | 9/2014 | Alameh et al. | |
| 2014/0274150 A1 | 9/2014 | Marti | |
| 2014/0283135 A1 | 9/2014 | Shepherd | |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026588 A1 | 1/2015 | Turcotte et al. | |
| 2015/0026623 A1 | 1/2015 | Horne | |
| 2015/0031397 A1 | 1/2015 | Jouaux | |
| 2015/0082396 A1 | 3/2015 | Theebaprakasam et al. | |
| 2015/0358315 A1 | 12/2015 | Cronin | |
| 2015/0358316 A1 | 12/2015 | Cronin | |
| 2015/0358333 A1 | 12/2015 | Cronin | |

FOREIGN PATENT DOCUMENTS

| | | |
|---|---|---|
| WO | WO 2015/187504 | 12/2015 |
| WO | WO 2015/187505 | 12/2015 |

OTHER PUBLICATIONS

Constantin, Lucian; "Fingerprint sensor in iPhone 5s is no silver bullet, researchers say", Computerworld, Sep. 20, 2013.

Falcon, Alvaris; "20 Gadgets That Make Your Smartphone even Smarter", hongkiat.com, 2012.

FingerQ. Copyright 2013-2014 FingerQ Macao Commercial Offshore Limited. Date of download Jul. 5, 2014. Http://www.fingerq.com/FQCA/fingerqchat.php?target=voicechat&lang=en.

"First Watch Security SRG717 SecuRemote Garage Access System", A fine WordPress.com site, Jun. 7, 2013.

Othoman, Asem; Ross, Arun; "Mixing fingerprints", SPIE, 2013.

Secure. Simple. Always Available., www.SenditCertifiedl.com, Video Reference best viewed at this link: https://www.youtube.com/watch?v=w2SO7DBzVsQ. Date of download Jul. 10, 2014.

Secure. Simple. Always Available., Proof of Delivery Log, www.SenditCertifiedl.com, Video Reference best viewed at this link: https://www.youtube.com/watch?v=mUKI2aXHdB4. Date of download Jul. 10, 2014.

"Wifi Garage Door Options" Postscapes, download date Dec. 17, 2013.

PCT Application No. PCT/US2015/033389 International Search Report and Written Opinion mailed Sep. 2, 2015.

U.S. Appl. No. 14/622,803; Office Action mailed May 21, 2015.

U.S. Appl. No. 14/622,806; Office Action mailed May 18, 2015.

PCT Application No. PCT/US2015/032883 International Search Report and Written Opinion mailed Aug. 21, 2015.

PCT Application No. PCT/US2015/033387 International Search Report and Written Opinion mailed Aug. 25, 2015.

U.S. Appl. No. 14/622,808; Office Action mailed Apr. 22, 2015.

U.S. Appl. No. 14/622,808; Final Office Action mailed Sep. 30, 2015.

U.S. Appl. No. 14/622,803; Final Office Action mailed Dec. 4, 2015.

* cited by examiner

SECURE COMMUNICATIONS SMARTPHONE SYSTEM

CROSS-REFERENCE TO RELATED APPLICATIONS

The present application is a continuation and claims the priority benefit of U.S. patent application Ser. No. 14/266,816 filed Apr. 30, 2014, now U.S. Pat. No. 8,838,071 the disclosure of which is incorporated herein by reference.

BACKGROUND

1. Field of the Invention

The present invention generally relates to the field of smartphone communications and in particular to securing smartphone communications using biometric locking systems to verify the identity of the recipient of a smartphone communication.

2. Description of the Related Art

Biometrics have become readily available in current smartphones. Initial uses for biometrics (e.g., fingerprint, voice recognition, face recognition) are embodied in specialty third party applications. The use of biometrics to lock and unlock a smartphone are examples of biometric functions that may be built into the operating systems of various smartphones currently commercialized in the market.

Many different operating system-level smartphone functions, such as mail, text, and video communications may be improved if an operating system-level biometric was used for added security. For example, a user may wish to ensure that communications sent from their mobile device to another person are especially secure. Such communications involving financial information (e.g., with a bank requesting a transfer of funds between accounts), business trade secrets, health information, personal information, legal information, privileged information, and other types of confidential information. There is, however, no method or system currently available for providing a simple way to secure those communications.

There is, therefore, a need for securing smartphone communications using biometric locking systems that verify the identity of the intended recipient of a smartphone communication before that communication can be made accessible to be interpreted, read, viewed, or otherwise played or executed.

SUMMARY OF THE CLAIMED INVENTION

Embodiments of the present invention may include a method, system, and non-transitory data storage medium operating on a processor that provides biometric security of digital communications. The invention will typically be implemented on a smartphone, yet may be implemented on other types of computing devices. The types of communications that may be secured can include, yet are not limited to, email, text messages, iMessages, files, links, Universal Resource Locators (URLs), videos, photos, attachments, or other forms of electronic data or media communications.

In various circumstances, biometrics-based security systems may be faster, easier, and more convenient for the user than entering a passcode. Biometrics of different sorts have different advantages. For example, fingerprinting, face recognition, and retinal scans are silent, and may be used without interrupting or bothering others in the same room. Voice recognition may be flexible, as virtually any word may be a keyword. Users may be allowed to select any combination of biometrics that best suits their particular circumstances or preferences.

Embodiments of the invention include a sender selecting an icon on the graphical user interface of a smartphone. In response to receiving the icon selection, the smartphone may display a communication interface on the smartphone's GUI. The sender may then enter a digital communication into the communication interface. Information entered into the communication interface may include, yet is not limited to, the recipient's name, address, or identifier in a field of the user interface. Alternatively, the information entered into the communication interface may be a phone number. The sender may also enter text, attach attachments, or make an audio or video call. The text, attachments, and the audio or video call may be one or more portions of a digital communication that can be sent to a recipient or addressee of the digital communication. The sender may also select one or more biometric inputs that the recipient of the communication must enter before being allowed access to all or part of the digital communication. Once the sender has entered the recipient's information and selected the one or more biometric inputs, the sender can initiate the transmission of the digital communication through the communication interface. The user can typically initiate the transmission by selecting a part of the communication interface that corresponds to sending the communication, or that corresponds to calling the recipient. The digital communication may then be transmitted to the recipient over a data communication path. In certain instances, the sender may select the type of data communication path over which the communication is to be sent, or request that he or she wishes to receive a receipt that indicates that all or a portion of the communication has been unlocked by the recipient. The receipt may be sent using the same data communication path used to transmit the digital communication, or may be sent over another data communication path supported by the sender's smartphone.

From the perspective of the sender's smartphone, the method described above may include receiving the icon selection selected by the sender, displaying a communication interface that corresponds to the selected icon, receiving a digital communication input by the sender, receiving one or more biometric locks selected by the sender, and transmitting the digital communication to a recipient identified by the sender of the digital communication.

In certain other instances, the sender may opt to lock the entire communication using a plurality of biometric locks, or may opt to lock only one or more portions of a communication using one or more biometric locks. A different biometric lock or different set of biometric locks may be requested by the sender and separately applied to each different portion of the communication secured by the biometric locks. The sender may also request a receipt after each of the different portions of the communication are unlocked. The sender may also decide not to secure a portion of the communication, thus enabling the recipient to review an email before opening a biometrically secured attachment. In addition to selecting biometrics locks required to open a secure communication, the sender may request that a recipient enter a passcode before being able to unlock the communication.

When a communication is received by a recipient computing device, the recipient will typically be presented with information displayed in the user interface of the recipient computing device. This information displayed may indicate that the communication, or portion thereof, is locked with one or more biometric locks. The recipient may then have to enter one or more biometric inputs into the recipient computing device before they can interpret, read, view, or listen to, or participate in the communication. The recipient computing device may also send one or more receipts to the sender of the communication. Such receipts may indicate that one or more portions of the communication have been unlocked by the recipient.

In certain instances, the recipient may have to enter the one or more biometric entries each time the communication is opened. This would prevent others from obtaining access to the secure communication after it was opened a first time.

DETAILED DESCRIPTION

Embodiments of the present invention include systems and methods for securing smartphone communications using biometric locking systems to verify the identity of the recipient of a smartphone communication. A sender of a secured communication may identify one or more biometrics required from a recipient before the recipient is allowed to interpret, read, view, or listen to the communication. Communications secured by the present invention may include email, text messages, iMessages, files, links, Universal Resource Locators (URLs), videos, photos, attachments, or other forms of electronic data or media communications.

Figure 1:
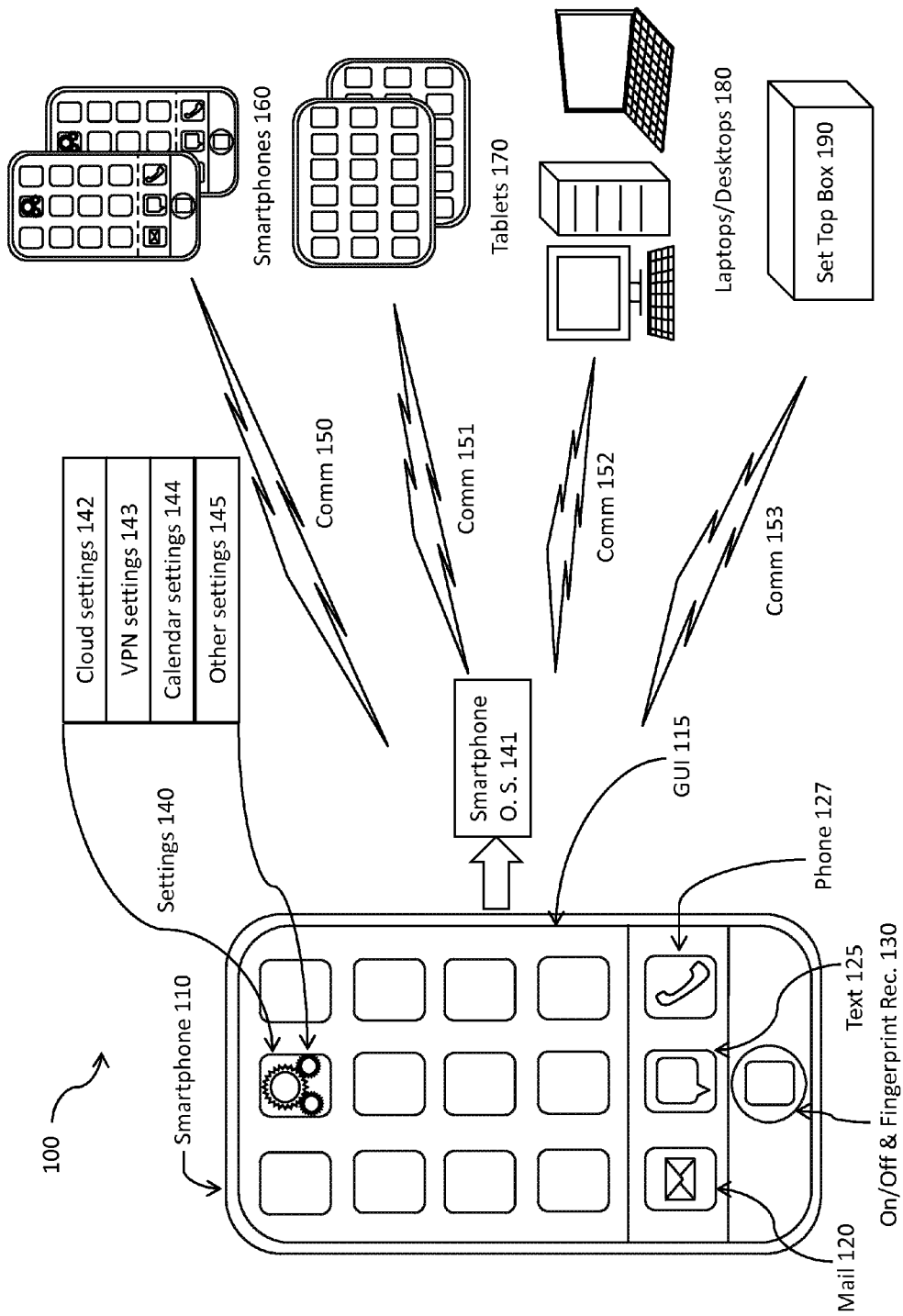
FIG. 1 illustrates an exemplary network environment in which a system for secured communications may be implemented.

FIG. 1 illustrates an exemplary network environment 100 in which a system for secured communications may be implemented. Network environment 100 may include user device 110, which may communicate over communication channels 150-153 with other user devices (e.g., smartphones 160, tablets 170, laptops/desktops 180, set-top boxes 190).

Users may use any number of different electronic user devices 110, such as general purpose computers, mobile phones, smartphones, personal digital assistants (PDAs), portable computing devices (e.g., laptop, netbook, tablets), desktop computing devices, handheld computing device, or any other type of computing device capable of communicating over a communication network (150-153 collectively). User device 110 may also be configured to access data from other storage media, such as memory cards or disk drives as may be appropriate in the case of downloaded services. User device 110 may include standard hardware computing components such as network and media interfaces, non-transitory computer-readable storage (memory), and processors for executing instructions that may be stored in memory.

User device 110 is illustrated in FIG. 1 as a smartphone that is able to perform many of the functions of a computer. Certain embodiments of the user device 110 may have a display screen (which may be a touchscreen) and an operating system 141 capable of running general purpose applications. Smartphone devices 110 may include, yet are not limited to an iPhone™ or an Android™ device.

User devices 110 may include one or more icons on a graphical user interface 115 (GUI) of the user device 110. Such icons may include a mail icon 120, text icon 125, phone icon 127, and settings icon 140. Mail icon 120 is a region of the GUI 115 that allows a user to access email functions, which may be used with any type of email account known in the art (e.g., Microsoft Outlook). Text icon 125 is a region of the GUI 115 which may allow user to access SMS and other messaging services known in the art (e.g., instant messages, iMessage). Phone icon 127 is a region of the GUI 115 that allows user to access cellular phone functions, including making and receiving calls, viewing contacts, accessing voicemail message, etc.

Some user devices 110 may further include a fingerprint recognition 130 component. Fingerprint recognition 130 may be a button on the smartphone 110 that unlocks the GUI 115 only when a user fingerprint matches a stored fingerprint. In some user devices, such a component for fingerprint recognition 130 may be integrated with other functions (e.g., On and Off, activation of display screen), which may be defined in part by the user. The ability of fingerprint recognition 130 to recognize a particular individual fingerprint may enable the security of a session by requiring a biometric fingerprint.

Many user devices 110 having such biometric components (e.g., fingerprint recognition 130) may already provide their users with the ability to input, authenticate, and store their own biometrics. In some embodiments, an installable or downloadable application may provide additional options for managing or using such biometric data, including the uses described herein.

Settings icon 140 is a region of the GUI 115 that allows a user to access settings or functions of an operating system (OS) 141 and of applications installed on the user device 110. In certain embodiments, the settings icon 140 may initiate adjustments in how the user device 110 interacts with network connections, screen brightness, or cloud storage. Such settings available via settings icon 140 may vary based on the particular type of OS 141.

OS 141 is software that facilitates interaction between a user and the hardware of the user device 110. The type of OS 141 installed on user device 110 is generally based on the type of user device (e.g., iPhone™ or Android™). In some embodiments, the OS 141 may include cloud settings 142, VPN settings 143, calendar settings 144, and other settings 145.

Cloud settings 142 may include functions that allow a user to adjust settings for cloud computing. Functions that may be setup or configured may include, yet are not limited to, selecting a cloud hosting platform, configuring a virtual computer, adjusting firewall parameters, adjusting security or login settings. Such settings may also affect the way data is stored in various cloud hosts (e.g., Google Drive™ or Dropbox™). Thus, cloud settings 142 may adjust parameters relating to an amount of data storage, provide access to online office program applications, update permissions relating to collaborative document editing, or identify who has access to view files hosted by a cloud service.

VPN settings 143 allow the user to adjust settings for a virtual private network (VPN). These VPN settings 143 may allow a user of the user device 110 to select an encryption technique, adjust a confidentiality setting, authenticate a user, change message integrity settings, or make changes that affect a connection to a VPN server.

Calendar settings 144 allow a user to adjust settings for a calendar application. Calendar settings 144 typically include, yet are not limited to, accepting or rejecting meeting requests, adjusting the time zone, clearing calendar search history, modifying settings relating to event reminders, setting the first day of the week, or changing other settings that relate to accessing a calendar event.

Other settings 145 allow a user to adjust settings for other applications. For example, a user may wish to adjust settings for the Apple™ Facetime application that affect the level of security of a Facetime session. In other instances, these other settings may select a codec for initiating a video or an audio call. Different settings known in the art may be available and may be specific to different types of applications on user device 110.

User device 110 may communicate with various computing devices including, yet not limited to, smartphones 150, tablets 170, laptops/desktops 180, and set-top boxes 190. FIG. 1 shows various communication channels 150, 151, 152, and 154. Each of these communication channels or paths may transmit one or more types of communications, which may include data, audio, video, text message, email, etc. Each of these communication paths may be implemented using any data communication path known in the art including, yet not limited to, 3G, 4G, WiFi, or another data communication path capable of transmitting information.

Smartphones 160 may be any type of smartphone, such as iPhone™ or Android™ devices. Tablets 170 may include or be integrated in mobile computers, which typically include a display, electronic circuitry, and a battery in a single unit. Examples of tablets 170 include, yet are not limited to, Apple iPads and Windows Surfaces tablet computers. Laptops/desktops 180 are electronic devices for storing and processing data. Laptops/Desktops 180 may include portable or stationary computers such as Macbooks and PCs. Set-top boxes 190 may be box-shaped devices that, inter alia, convert digital television signals to analogue for viewing on a conventional set, or that enable cable or satellite television to be viewed. In certain embodiments of the invention, set-top boxes 190 may include a television or satellite recipient.

A sender may initiate a digital communication with a recipient by first unlocking the user device 110, and then by interacting with one of the icons in the GUI 115. When the sender initiates a communication (e.g., email, text) to one or more smartphones 160, the communication may be sent via a communication path 150. It should be understood that the user may not necessarily select the communications path used. Rather, the user device 110 may select any available communications path. When a user is making phone calls, however, the user device 110 might use a 4Q network to maintain performance or quality of a particular call. Thus, in certain instances, the user may specify the type of communication path to use for a particular purpose. The present invention is therefore not limited to a particular type of communication path, and the present invention may include support for a variety of possible types of communication paths.

Figure 2:
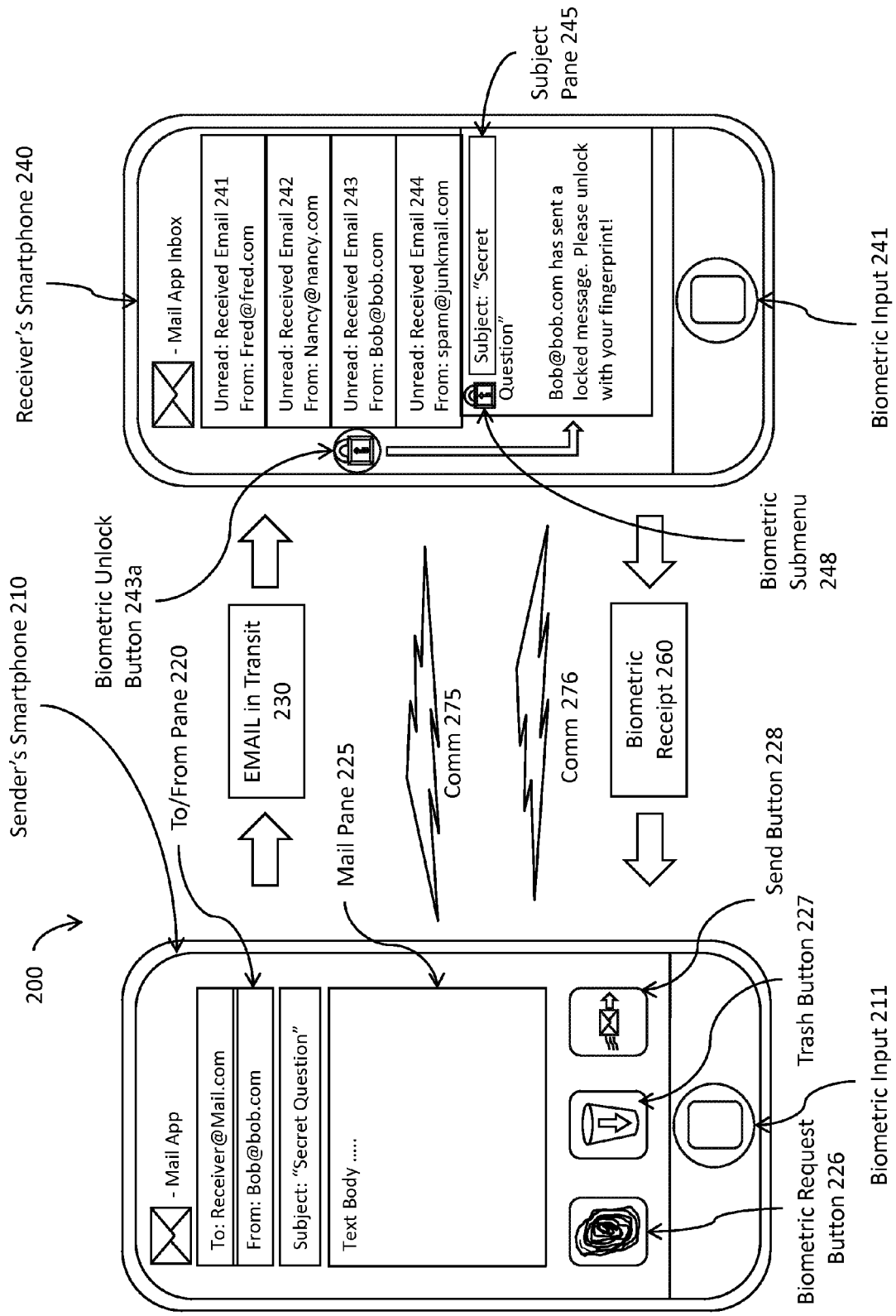
FIG. 2 illustrates an exemplary graphical user interface of a first smartphone used to compose and send a secured communication and an exemplary graphical user interface of a second smartphone that has received the secured communication.

FIG. 2 depicts the graphical user interface of two smartphones, a first smartphone 210 used to compose and send an Email, and a second smartphone 240 that has received Email. A sender "bob@bob.com" prepares and sends an email on the smartphone 210 to "fred.@fred.com," which is received on the recipient's smartphone 240. Both the sender smartphone 210, and the recipient's smartphone 240 include a biometric input (e.g., biometric input 211 on sender smartphone 210 and biometric input 241 on recipient smartphone 240).

The sender smartphone 210 may include a to/from pane 220, a mail pane 225, a biometric request button 226, trash button 227, and send button 228. The to/from pane 220 pane typically displays the sender and the recipient of an email. The mail pane 225 typically displays the text of an email being composed. The biometric request button 226 allows the sender to request biometric verification from recipient before all or part of an email is displayed. In certain embodiments, this button allows the sender to request fingerprint verification from the recipient before the recipient can unlock and view the message.

Trash button 227 allows the sender to discard a drafted email or delete a received email. Send button 228 allows the sender to send a composed email to the recipient. Email in transit 230 depicts the sending of an email entitled "Secret Question." In this instance, the email 230 includes a request for biometric verification.

The recipient smartphone 240 may display a mail inbox, which lists a plurality of email headers of received emails 241-244 from various senders. Received email 241 is an unread email from "Fred@fred.com," received email 242 is an unread email from "Nancy@nancy.com," received email 243 is a locked email from "Bob@bob.com," and received email 244 is mail content from "spam@junkmail.com."

Biometric unlock button 243*a* may be displayed next to the locked message 243 from "Bob@bob.com" sent from sender smartphone 210. When the recipient of recipient smartphone 240 selects the biometric unlock button 243*a*, a biometric submenu 248 may be displayed. The biometric submenu 248 includes subject pane 245 displaying the subject "Secret Question". Biometric Submenu 248 also includes a message that states "Bob@bob.com has sent a locked message. Please unlock with your fingerprint!" The graphic icon of a lock next to the subject menu 245 may also provide an indication that the message is locked.

Biometric receipt 260 may also be sent from the recipient smartphone 240 to the sender smartphone 210 after the recipient successfully unlocks the locked message. Biometric receipt 260 may be sent over any available communication path and may inform the sender that the recipient has successfully unlocked the message sent by the sender. The biometric receipt 260 may also indicate the date/time that the message was unlocked and may also identify the particular message that was unlocked by the recipient. Communication paths 275 and 276 may be used for various types of communications such as phone calls, text messages, or emails.

Figure 3:
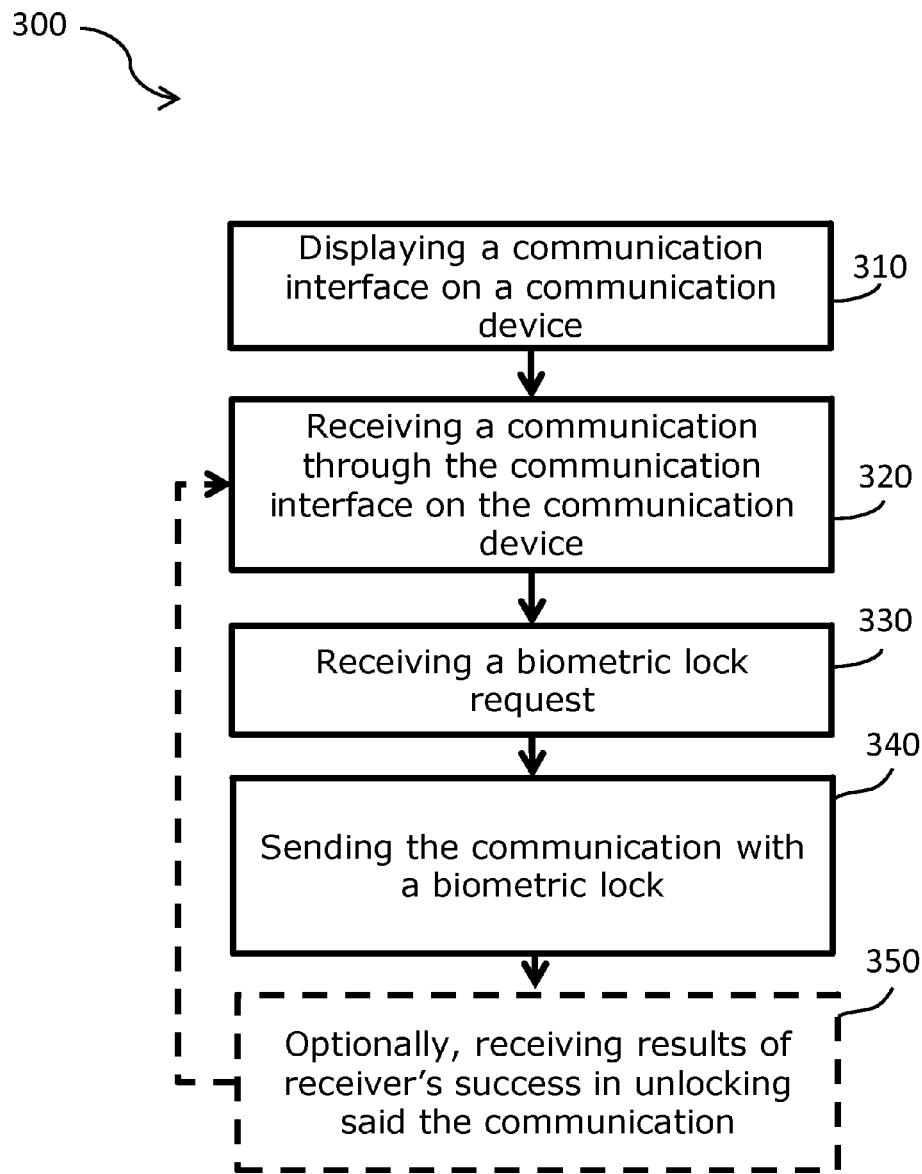
FIG. 3 is a flowchart illustrating an exemplary method for secured communications.

FIG. 3 is a flowchart illustrating an exemplary method 300 for secured communications, which allows a sender of a first communication to request that a biometric verification be performed by a recipient before the first communication can be interpreted, read, viewed, or listened to. The method may further optionally allow a sender to receive confirmation that the first communication has been successfully unlocked on the recipient's smartphone.

In step 310, a communication interface may be displayed on a communication device. Such a communication interface may include, yet are not limited to, input fields for email address, phone number, an internet protocol (IP) address, or a shortcut for an address. In certain instances, the communication interface may be an interface of an email application on a sender smartphone. In other instances, the communication interface may be an interface for entering or attaching text messages, iMessages, files, links, Universal Resource Locators (URLs), videos, photos, or other forms of electronic data or media.

In step 320, the communication device receives a communication that may be inputted via the communication interface of the communication device. A user of the communication device may input content of a message into or through the communication interface displayed on the communication device. In certain instances, the user interface may be accessible to authorized senders only, such that only authorized senders are allowed to create new communications (e.g., composing an email or text message, initiating a phone call) on the communication device. Based on user settings, such communications may include any manner of text messages, iMessages, files, links, Universal Resource Locators (URLs), videos, photos, or other forms of electronic data or media.

In step 330, a biometric lock request may be received from the user (sender). The sender may indicate that biometric verification is required to view the communication and may further select a specific biometric verification method (or methods) to secure the communication. For example, the biometric lock request may indicate that a fingerprint of the recipient be used to lock the communication. In addition, the sender may also request that a biometric receipt be generated and returned once the recipient has successfully unlocked the communication.

In step 340, the communication and its associated biometric lock may be sent to the designated recipient. Such a biometric lock may be associated with a request that a recipient of the communication unlock the communication using the selected biometric input(s). In certain instances, the recipient will not be able to view, watch, or listen to the message until biometric input verification of the recipient has been completed.

Where the sender had previously requested a biometric receipt, the sender may receive such a biometric receipt indicating that the recipient has succeeded in unlocking the communication in step 350. Such receipt may be an email, text message, or other type of notification made accessible to the sender.

Figure 4:
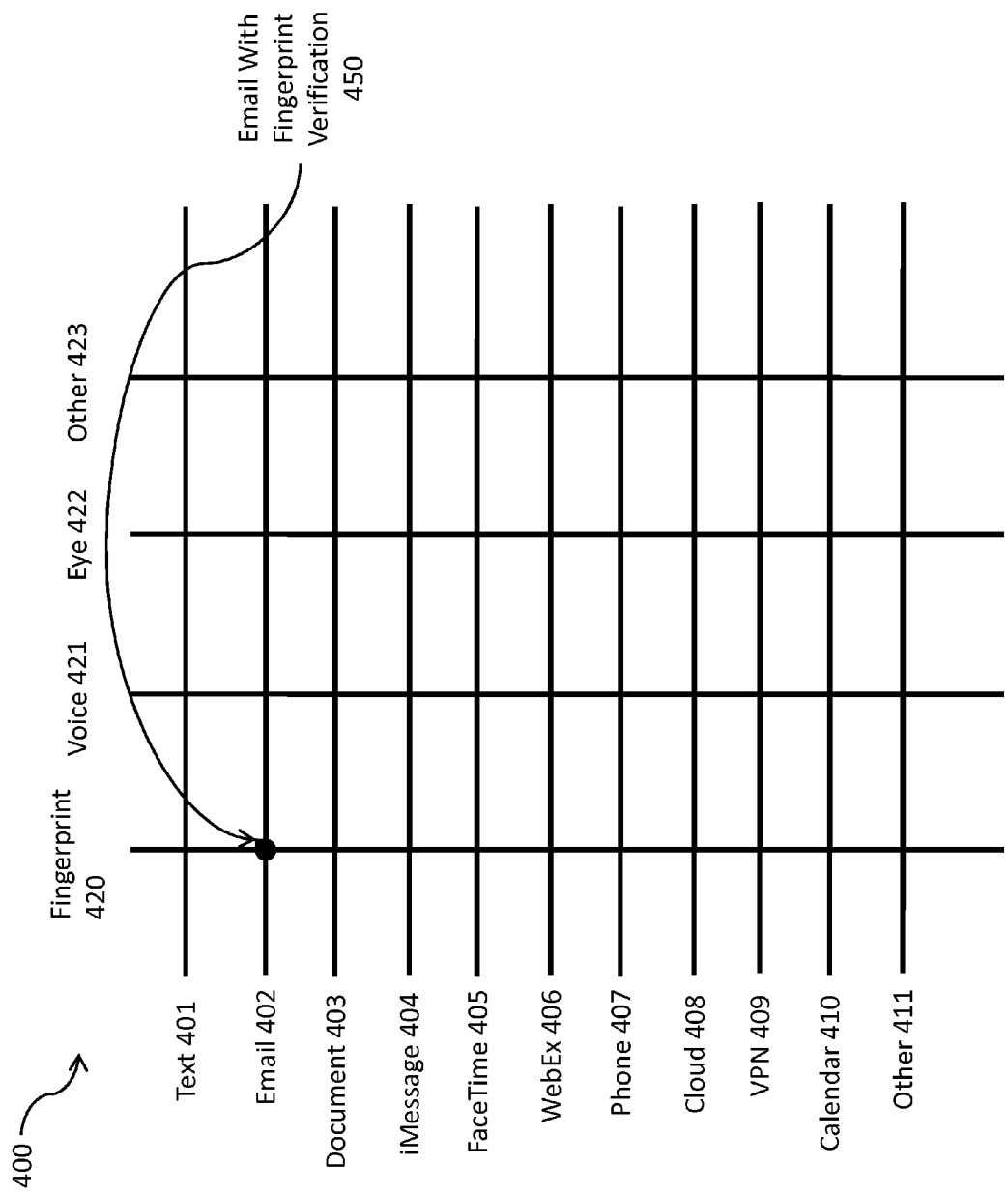
FIG. 4 is a diagram illustrating exemplary communication methods and security options that may be used in a system for secured communications.

FIG. 4 is a diagram illustrating exemplary communication methods and security options that may be used in a system for secured communications. Many types of biometrics or combinations of biometrics may be used, including yet not limited to, fingerprint, voice, and eye biometrics.

Communication methods may include text 401, email 402, document 403, instant messaging (e.g., iMessage) 404, video telephony (e.g., FaceTime) 405, video conferencing (e.g., WebEx) 406, phone 407, cloud 408, VPN 409, calendar 410, and other 411. Text 401 is an electronic communication sent and received by cellular phone (e.g., SMS or MMS messages). Email 402 is a message distributed by electronic means from one computer user to one or more recipients via a network from a smartphone email application and may include text, graphics, video, and any type of attachments known in the art. Email 402 may be relayed between a sender via an email account (sender@mail.com) to one or more recipients via their respective email accounts (recipient@mail.com). Document 403 may be any type of document and/or digital computer file with extensions .doc, .docx, .rtf, etc.

Instant messaging 404 may include any type of instant messenger service (e.g., iMessage). Video telephony 405 may include any type of video messenger service (e.g., Facetime). Video conferencing 406 may include any type of on-demand collaboration, online meeting, web conferencing, or video conferencing application (e.g., WebEx). In certain instances video conferencing 406 may enable video teleconference between two or more users on laptop or smartphone devices.

Phone 407 may include any type of real-time audio communications on a smartphone device. Cloud 408 may include any of a variety of remote server systems that may be used to store, manage, and process data (e.g., DropBox, Google Drive).

VPN 409 is a virtual private network that provides sessions secured with biometric locks. As such, users in a remote locations may securely access data files stored on a company server. Calendar 410 may include any type of timekeeping or calendar application within a smartphone device that allows the user to manage schedules, appointments, events, etc. and set notifications by date and time. Other 411 may refer to other forms of digital transmission (e.g., financial data) that a user may wish to secure.

Fingerprint 420 may include any type of biometric data derived from a person's fingertip, especially as used for to identify individuals from the unique pattern of whorls and lines of the same. Such fingerprints 420 can be read by any electronic device known in the art for capturing the same. Such fingerprint capture may be then compared to a stored pattern associated with a particular user and finger.

Additional biometric inputs may further include voice 421, eye 422, and other 423. Voice 421 may include any form of voice recognition that identifies a person by analyzing characteristics of their voice (voice biometrics). In certain instances, a biometric device can record and store the unique pattern of a user's voice saying a name, keyword, phrase, etc. Eye 422 may include any automated method for biometric identification based on the user's eye. Biometrics related to eye 422 may include mathematical pattern-recognition techniques on video images of the irises or retinas of one or more of an individual's eyes. The eyes of an individual have complex random patterns that are unique to an individual, and these patterns can be seen from some distance. These complex random patterns may be captured by a camera and/or other device that can read and store the unique pattern of a user's iris. Other 423 may refer to other forms of digital biometric recognition known in the art (e.g., facial recognition).

As FIG. 4 illustrates, any combination of communication methods and biometric verification 400 options may be possible. Each intersection of the grid represents one communication method with one corresponding biometric identification method. For example, email 402 may be associated with fingerprint verification 420 at intersection 450. The dot at this intersection 450 indicates that an email communication may be locked with fingerprint 420 biometric verification, which may require a recipient of an email 402 to enter their fingerprint before the recipient may read all or part of such email 402.

Figure 5:
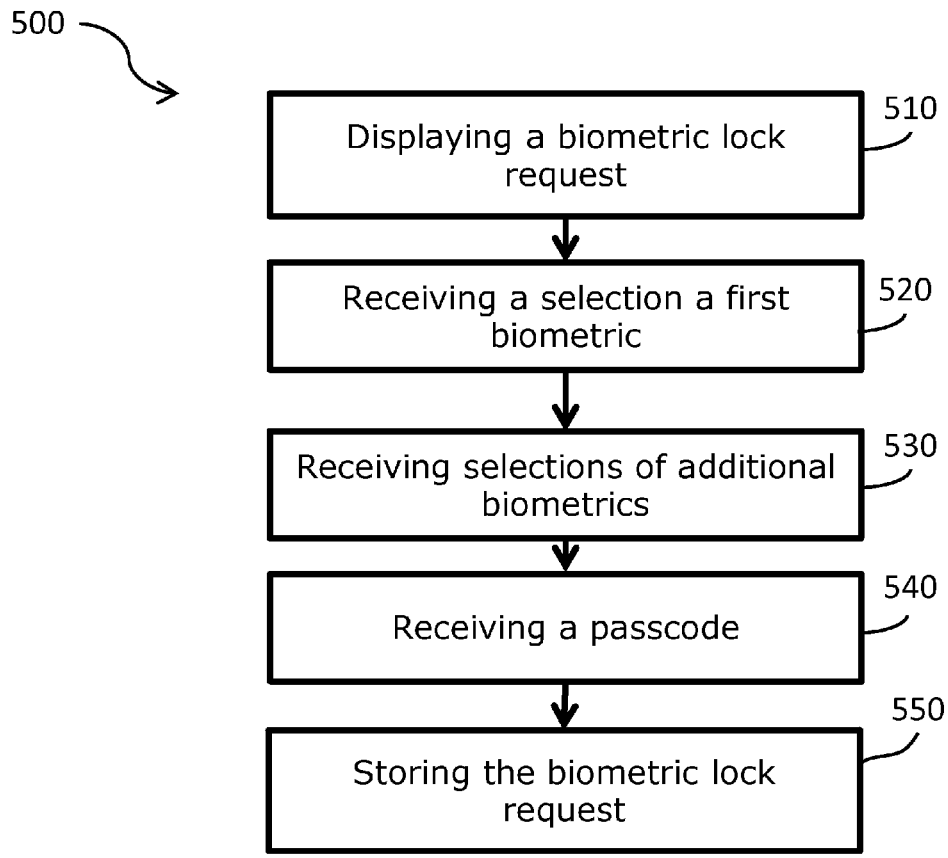
FIG. 5 is a flowchart illustrating an alternative exemplary method for secured communications.

FIG. 5 is a flowchart illustrating an alternative exemplary method 500 for secured communications. Such a method allows a sender of a first communication to request a first biometric verification and optionally allowing the sender to request additional biometrics and a passcode before the first communication can be interpreted.

In step 510, a biometric lock request may be displayed. The sender's smartphone may display one or more biometric locks on the communication interface of the sender that may be selected by the sender (e.g., part of the sender user interface which initiates biometric selection to secure an email communication).

In step 520, a first biometric selection may be received from the sender to lock at least a portion of the communication. The sender may select from a list of biometric security options.

In step 530, additional biometric selections may be received from the sender to lock at least a portion of the communication. The sender may select from a list of additional biometric security options. In certain instances, the user interface on the sender's smartphone may display a listing or image of various biometrics from which the sender may select to secure a communication.

In step 540, a passcode may be received from the sender to lock at least a portion of the communication. In this step, the sender typically enters a passcode into the communication interface of the sender's smartphone. In certain instances, the passcode allows the sender to enter an alpha-numeric passcode that must be used to unlock the communication. The selection of the passcode function may be included in a specific portion of the user interface of the senders smartphone.

In step 550, the biometric lock request may be stored. In certain instances, the sender may be allowed to save selected biometrics and passcode. This step may be set up in operating system settings via a settings icon on the user device. The sender's selection may be saved and used to lock a designated email in accordance with the selected options. In certain instances, the recipient of the communication would not only be required to provide a biometric to unlock the communication, but the recipient may also be required to enter the same passcode entered by the sender of the communication to unlock the communication.

It should be obvious to those skilled in the art that the recipient has the ability to create, authenticate, and store their own multiple biometrics. It should also be obvious that, in certain instances, the recipient must enter multiple biometrics and enter the passcode to be able to unlock the communication.

Figure 6:
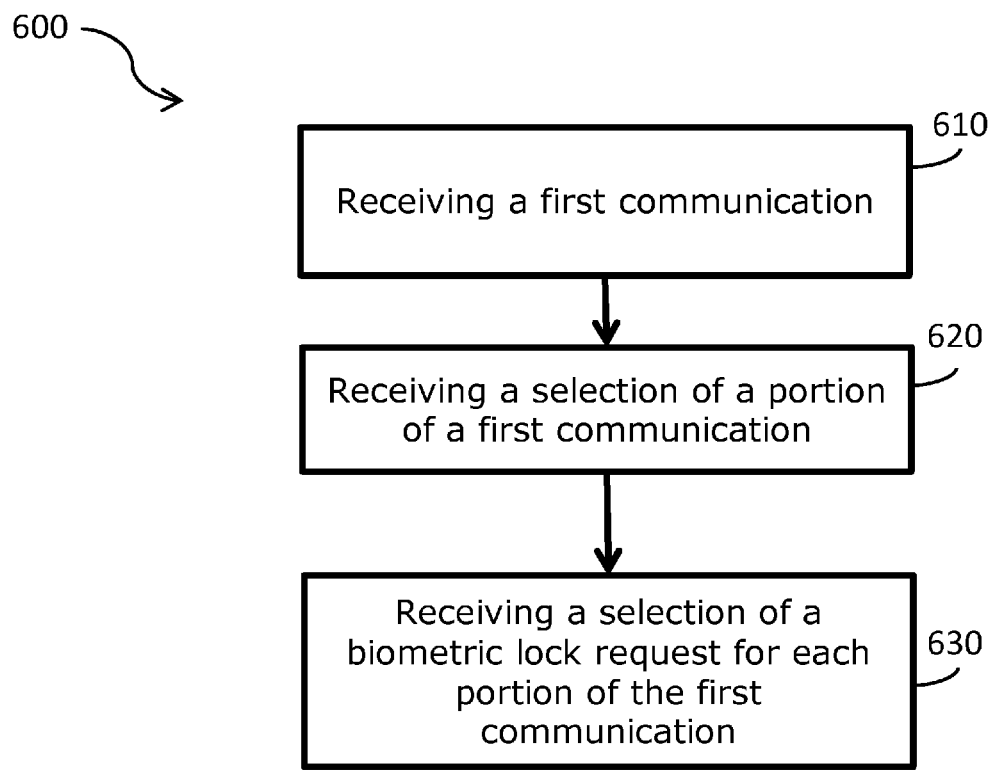
FIG. 6 is a flowchart illustrating another alternative exemplary method for secured communications.

FIG. 6 is a flowchart illustrating another alternative exemplary method 600 for secured communications, which allows a sender to request a biometric verification for a portion of the communication before that portion can be interpreted, viewed, read, or listened to.

In step 610, a first communication may be received from a sender. The sender may create a first communication (e.g., by entering or selecting text, data, email, audio or video call, attachments, and other forms of content to be included).

In step 620, a selection may be received from the sender regarding at least a portion of the first communication. The sender may select any part (or all parts) of the first communication to be locked and unlocked using a selected biometric.

In step 630, a request may be received from the sender. Such request (or requests) may designated each portion of the first communication to lock based on a selected biometric lock. Different biometric locks (or combinations thereof) may be selected for different portions. For example, a body of an email may be locked based on a first biometric, and an attachment to that email may be locked with a different biometric lock.

Figure 7:
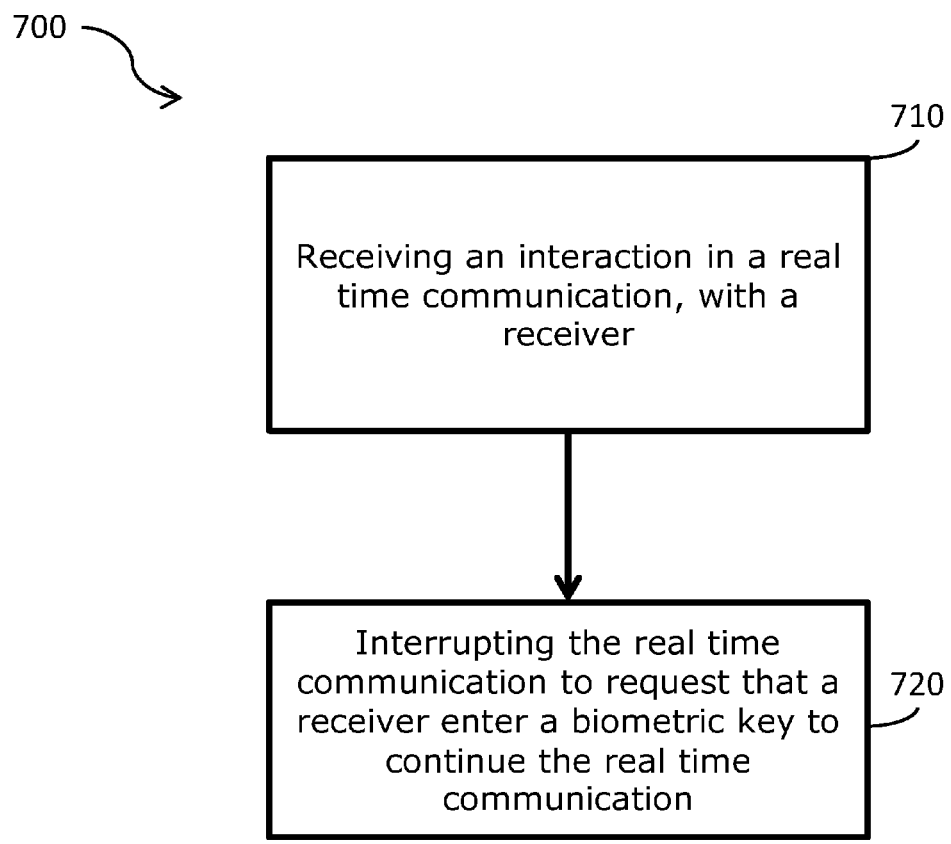
FIG. 7 is a flowchart illustrating yet another alternative exemplary method for secured communications.

FIG. 7 is a flowchart illustrating yet another alternative exemplary method 700 for secured communications, which provides real-time biometric verification security. Such method 700 allows for real-time communication to be interrupted until a user provides a biometric verification of their identity. The biometric verification may be required before the communication may be allowed to continue.

In step 710, an interaction may be received from a sender in the course of a real-time communication with a recipient. For example, the sender may be engaging in a live telecommunication with a remote user and wish for certain data exchanged therein to be secured with biometric keys. A specific example may be a phone conversation with a financial institution and exchange of financial data.

In step 720, the real-time communication may be interrupted or paused to request that a recipient enter a biometric key before allowing the real time communication to continue. For example, the sender may request that certain biometrics (e.g., voice, fingerprint, or iris verification of identify) to be provided before communicating sensitive financial information.

A preferred embodiment of the invention incorporates at least a portion of the functionality described above in the operating system of an election device. In certain of these embodiments, at a portion of this functionality may be incorporated into CORE OS in an Apple™ IPhone™, or in the kernel of the operating system of an Android™ device.

Figure 8:
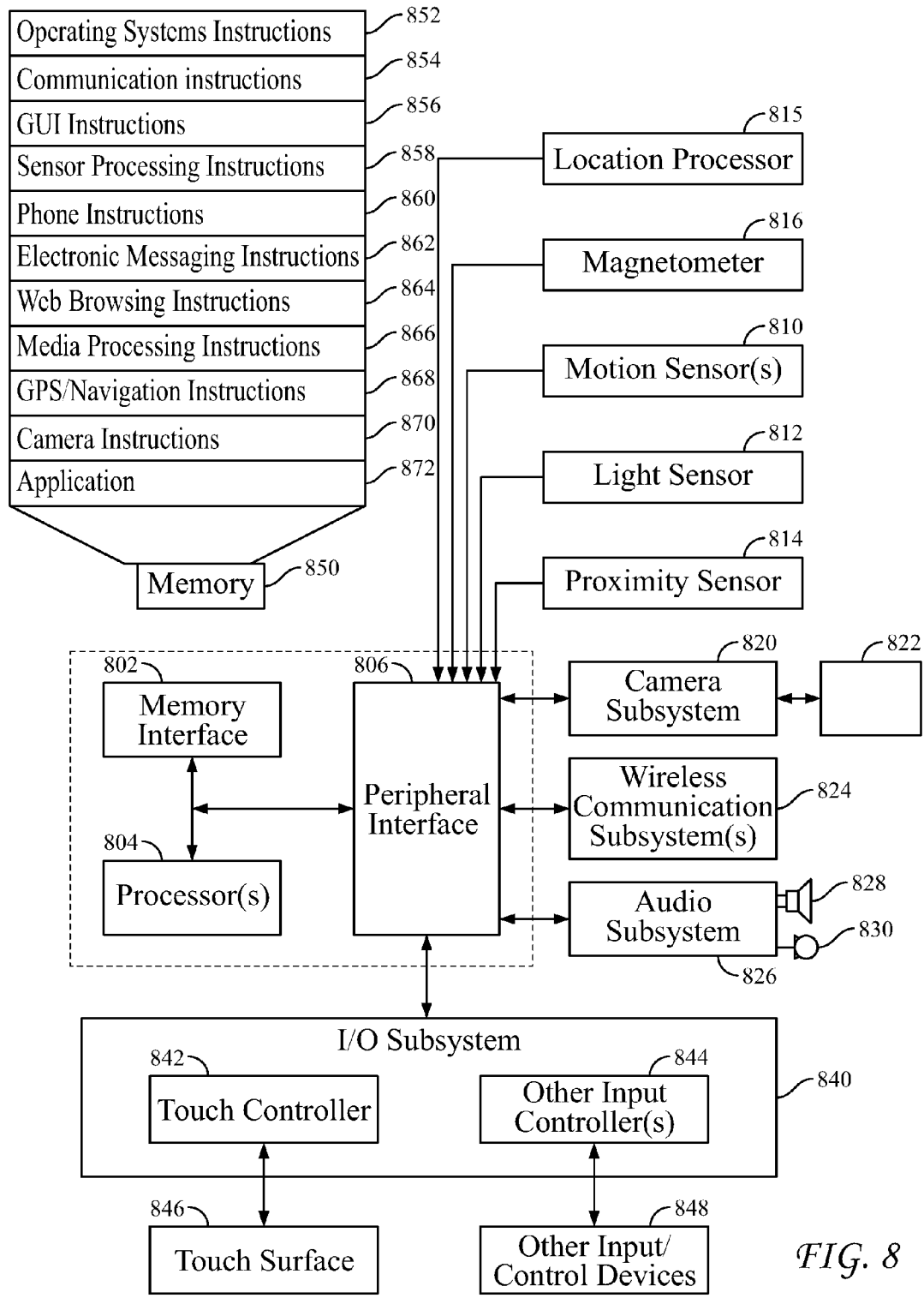
FIG. 8 illustrates a mobile device architecture that may be utilized to implement the various features and processes described herein.

FIG. 8 illustrates a mobile device architecture that may be utilized to implement the various features and processes described herein. Architecture 800 can be implemented in any number of portable devices including but not limited to smart phones, electronic tablets, and gaming devices. Architecture 800 as illustrated in FIG. 8 includes memory interface 802, processors 804, and peripheral interface 806. Memory interface 802, processors 804 and peripherals interface 806 can be separate components or can be integrated as a part of one or more integrated circuits. The various components can be coupled by one or more communication buses or signal lines.

Processors 804 as illustrated in FIG. 8 are meant to be inclusive of data processors, image processors, central processing unit, or any variety of multi-core processing devices. Any variety of sensors, external devices, and external subsystems can be coupled to peripherals interface 806 to facilitate any number of functionalities within the architecture 800 of the exemplar mobile device. For example, motion sensor 810, light sensor 812, and proximity sensor 814 can be coupled to peripherals interface 806 to facilitate orientation, lighting, and proximity functions of the mobile device. For example, light sensor 812 could be utilized to facilitate adjusting the brightness of touch surface 846. Motion sensor 810, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 806, such as a temperature sensor, a biometric sensor, or other sensing device to facilitate corresponding functionalities. Location processor 815 (e.g., a global positioning transceiver) can be coupled to peripherals interface 806 to allow for generation of geo-location data thereby facilitating geo-positioning. An electronic magnetometer 816 such as an integrated circuit chip could in turn be connected to peripherals interface 806 to provide data related to the direction of true magnetic North whereby the mobile device could enjoy compass or directional functionality. Camera subsystem 820 and an optical sensor 822 such as a charged coupled device (CCD) or a complementary metal-oxide semiconductor (CMOS) optical sensor can facilitate camera functions such as recording photographs and video clips.

Communication functionality can be facilitated through one or more communication subsystems 824, which may include one or more wireless communication subsystems. Wireless communication subsystems 824 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 824 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 824 may include hosting protocols such that the device may be configured as a base station for other wireless devices. Communication subsystems can also allow the device to synchronize with a host device using one or more protocols such as TCP/IP, HTTP, or UDP.

Audio subsystem 826 can be coupled to a speaker 828 and one or more microphones 830 to facilitate voice-enabled functions. These functions might include voice recognition, voice replication, or digital recording. Audio subsystem 826 in conjunction may also encompass traditional telephony functions.

I/O subsystem 840 may include touch controller 842 and/or other input controller(s) 844. Touch controller 842 can be coupled to a touch surface 846. Touch surface 846 and touch controller 842 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 846 may likewise be utilized. In one implementation, touch surface 846 can display virtual or soft buttons and a virtual keyboard, which can be used as an input/output device by the user.

Other input controllers 844 can be coupled to other input/control devices 848 such as one or more buttons, rocker switches, thumb-wheels, infrared ports, USB ports, and/or a pointer device such as a stylus. The one or more buttons (not shown) can include an up/down button for volume control of speaker 828 and/or microphone 830. In some implementations, device 800 can include the functionality of an audio and/or video playback or recording device and may include a pin connector for tethering to other devices.

Memory interface 802 can be coupled to memory 850. Memory 850 can include high-speed random access memory or non-volatile memory such as magnetic disk storage devices, optical storage devices, or flash memory. Memory 850 can store operating system 852, such as Darwin, RTXC, LINUX, UNIX, OS X, ANDROID, WINDOWS, or an embedded operating system such as VXWorks. Operating system 852 may include instructions for handling basic system services and for performing hardware dependent tasks. In some implementations, operating system 852 can include a kernel.

Memory 850 may also store communication instructions 854 to facilitate communicating with other mobile computing devices or servers. Communication instructions 854 can also be used to select an operational mode or communication medium for use by the device based on a geographic location, which could be obtained by the GPS/Navigation instructions 868. Memory 850 may include graphical user interface instructions 856 to facilitate graphic user interface processing such as the generation of an interface; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes, camera instructions 870 to facilitate camera-related processes and functions; and instructions 872 for any other application that may be operating on or in conjunction with the mobile computing device. Memory 850 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 850 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed:

1. An apparatus for securing a communication, the apparatus comprising:
   a memory;
   a processor executing instructions stored in the memory and that prepares the communication for transmission;
   a network communication interface; and
   a display that displays a user interface including a plurality of settings, one or more of which is a user selectable biometric setting that identifies one or more biometric inputs required to be input by a recipient, wherein the recipient is an addressee identified in the communication, and the recipient inputs the one or more required biometric inputs over one or more sensors at a recipient electronic device before at least a portion of the communication can be opened by the recipient.

2. The apparatus of claim 1, wherein the user interface includes a plurality of selectable communication types.

3. The apparatus of claim 2, wherein the plurality of selectable communication types are at least one of a text, an email, a document, an instant message, a group message, a video telephonic communication, an online meeting communication, a Cloud communication, a VPN communication, a calendar communication, a video communication, a voice mail, and a voice communication.

4. The apparatus of claim 2, wherein a particular selectable communication type of the plurality of communication types included in the user interface corresponds to an icon of the particular selectable communication type.

5. The apparatus of claim 1, wherein the one or more biometric inputs is at least one of a fingerprint, a voice input, an image of a face, a retinal input, and an iris input.

6. The apparatus of claim 1, wherein the plurality of settings are operating system settings.

7. The apparatus of claim 1, wherein the apparatus is at least one of a mobile phone, a smart phone, a tablet computer, a desk computer, and a set top box.

8. A method for securing a communication, the method comprising:
   receiving the communication composed by a user of an a user electronic device, wherein the communication is composed over a user interface at the user electronic device;
   displaying a plurality of settings on the user interface, wherein one or more of the plurality of settings is a user selectable biometric setting;
   receiving a selection over the user interface of one or more biometric inputs, wherein the one or more biometric inputs lock at least a portion of the communication, and the one or more biometric inputs are required to be input by a recipient of the communication before the at least portion of the communication can be opened by the recipient at a recipient electronic device; and
   transmitting the communication over a network communication interface at the user electronic device, wherein the recipient cannot access the at least portion of the communication until after the recipient enters the one or more biometric inputs over one or more sensors at the recipient electronic device.

9. The method of claim 8, wherein the user interface includes a plurality of selectable communication types.

10. The method of claim 9, wherein the plurality of selectable communication types are at least one of a text, an email, a document, an instant message, a group message, a video telephonic communication, an online meeting communication, a Cloud communication, a VPN communication, a calendar communication, a video communication, a voice mail, and a voice communication.

11. The method of claim 9, wherein a particular selectable communication type of the plurality of communication types included in the user interface corresponds to an icon of the particular selectable communication type.

12. The method of claim 8, wherein the one or more biometric inputs is at least one of a fingerprint, a voice input, an image of a face, a retinal input, and an iris input.

13. The method of claim 8, wherein the plurality of settings are operating system settings.

14. The method of claim 13, wherein the user electronic device is at least one of a mobile phone, a smart phone, a tablet computer, a desktop computer, and a set top box.

15. A non-transitory computer readable storage medium having embodied thereon a program executable by a processor to perform a method for securing a communication, the method comprising:
   receiving the communication composed by a user of an a user electronic device, wherein the communication is composed over a user interface at the user electronic device;
   displaying a plurality of settings on the user interface, wherein one or more of the plurality of settings is a user selectable biometric setting;
   receiving a selection over the user interface of one or more biometric inputs, wherein the one or more biometric inputs lock at least a portion of the communication, and the one or more biometric inputs are required to be input by a recipient of the communication before the at least portion of the communication can be opened by the recipient at a recipient electronic device; and
   transmitting the communication over a network communication interface at the user electronic device, wherein the recipient cannot access the at least portion of the communication until after the recipient enters the one or more biometric inputs over one or more sensors at the recipient electronic device.

16. The non-transitory computer readable storage medium of claim 15, wherein the user interface includes a plurality of selectable communication types.

17. The non-transitory computer readable storage medium of claim 16, wherein the plurality of selectable communication types are at least one of a text, an email, a document, an instant message, a group message, a video telephonic communication, an online meeting communication, a Cloud communication, a VPN communication, a calendar communication, a video communication, a voice mail, and a voice communication.

18. The non-transitory computer readable storage medium of claim 16, wherein a particular selectable communication type of the plurality of communication types included in the user interface corresponds to an icon of the particular selectable communication type.

19. The non-transitory computer readable storage medium of claim 15, wherein the one or more biometric inputs is at least one of a fingerprint, a voice input, an image of a face, a retinal input, and an iris input.

20. The non-transitory computer readable storage medium of claim 15 wherein the plurality of settings are operating system settings.

\* \* \* \* \*